US007478759B2

(12) United States Patent
Lung

(10) Patent No.: US 7,478,759 B2

(45) Date of Patent: Jan. 20, 2009

(54) METHOD AND SYSTEM FOR PRESENCE DETECTION OF WIRELESS ANTENNAE

(75) Inventor: Aaron Lung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 277 days.

(21) Appl. No.: 11/012,646

(22) Filed: Dec. 15, 2004

(65) Prior Publication Data

US 2006/0124751 A1 Jun. 15, 2006

(51) Int. Cl.
*G06K 19/06* (2006.01)
*H01Q 1/06* (2006.01)

(52) U.S. Cl. ....................................... 235/492; 343/720

(58) Field of Classification Search ................. 235/492; 343/720

See application file for complete search history.

(56) References Cited

U.S. PATENT DOCUMENTS 6,823,180 B2 * 11/2004 Reed et al. .................. 455/305
6,980,782 B1 * 12/2005 Braun et al. ............. 455/277.2
7,092,699 B1 * 8/2006 Hefter ..................... 455/414.1
2004/0033817 A1 2/2004 Gorsuch et al.
2004/0176050 A1 9/2004 Steer et al.

* cited by examiner

*Primary Examiner*—Daniel A Hess
(74) *Attorney, Agent, or Firm*—Trellis IP Law Group, PC

(57) ABSTRACT

An antenna, a wireless communication system, and a method for enabling presence detection of antennae are provided. The antenna includes a memory device that stores specifications of the antenna. These specifications are acquired by a wireless device in the wireless communication system. The wireless device is configured based on the specifications of the antenna.

16 Claims, 3 Drawing Sheets

METHOD AND SYSTEM FOR PRESENCE DETECTION OF WIRELESS ANTENNAE

BACKGROUND OF THE INVENTION

1. Field of Invention

Embodiments of the present invention relate in general to wireless communication systems. More specifically, embodiments of the present invention relate to methods and systems for presence detection of wireless antennae.

2. Description of the Background Art

Wireless communication systems are based on radio and infrared transmission mechanisms. In radio transmission mechanism-based wireless communication systems, antennae are associated with wireless devices. These antennae transmit and receive radio waves. Antennae can be captive or non-captive. Captive antennae are antennae that are permanently associated with wireless devices. Examples of captive antennae include antennae used in cellular phones. On the other hand, non-captive antennae are user-selectable antennae that can be detached from wireless devices. Exemplary non-captive antennae include the Cisco 'Aironet' antennae.

Antennae have varying specifications or characteristics. For example, antennae can differ in terms of their gain across frequencies, voltage standing wave ratio (VSWR) across frequencies, and in their radiation patterns. Even two antennae of the same design differ in their specifications. Therefore, wireless devices cannot be configured according to the specifications of the antennae associated with them. This results in non-optimal performance of the wireless devices. This problem is specifically applicable to wireless devices that are associated with non-captive antennae that are changed often. Therefore, these wireless devices are configured according to a blanket configuration, based on the worst expected specifications of the associated antennae.

SUMMARY OF EMBODIMENTS OF THE INVENTION

Embodiments of the present invention provide an antenna that comprises one or more memory devices that enable presence detection for the antenna. The memory devices store specifications of the antenna. The wireless device associated with the antenna can be configured based on the stored specifications.

Embodiments of the present invention also provide a wireless communication system. The wireless communication system comprises: (i) a wireless device; and (ii) one or more antennae associated with the wireless device. The antennae comprise means for storing specifications of the antennae.

Embodiments of the present invention further provide a method for presence detection of one or more antennae associated with a wireless device. The method comprises the steps of: acquiring the specifications of the one or more antennae; and configuring the wireless device, based on the acquired specifications of the one or more antennae.

These provisions, together with the various ancillary provisions and features that will become apparent to those artisans who possess skill in the art, as the following description proceeds, are attained by devices, assemblies, systems, and methods of embodiments of the present invention, various embodiments thereof being shown with reference to the accompanying drawings, by way of example only, wherein:

DETAILED DESCRIPTION OF EMBODIMENTS OF THE INVENTION

Embodiments of the present invention provide a system and method for presence detection of antennae associated with wireless devices. In accordance with various embodiments of the present invention, an antenna that is associated with a wireless device includes at least one memory device. The memory device is used for presence detection of the antenna. Specifications of the antenna can also be stored on the memory device.

Figure 1:
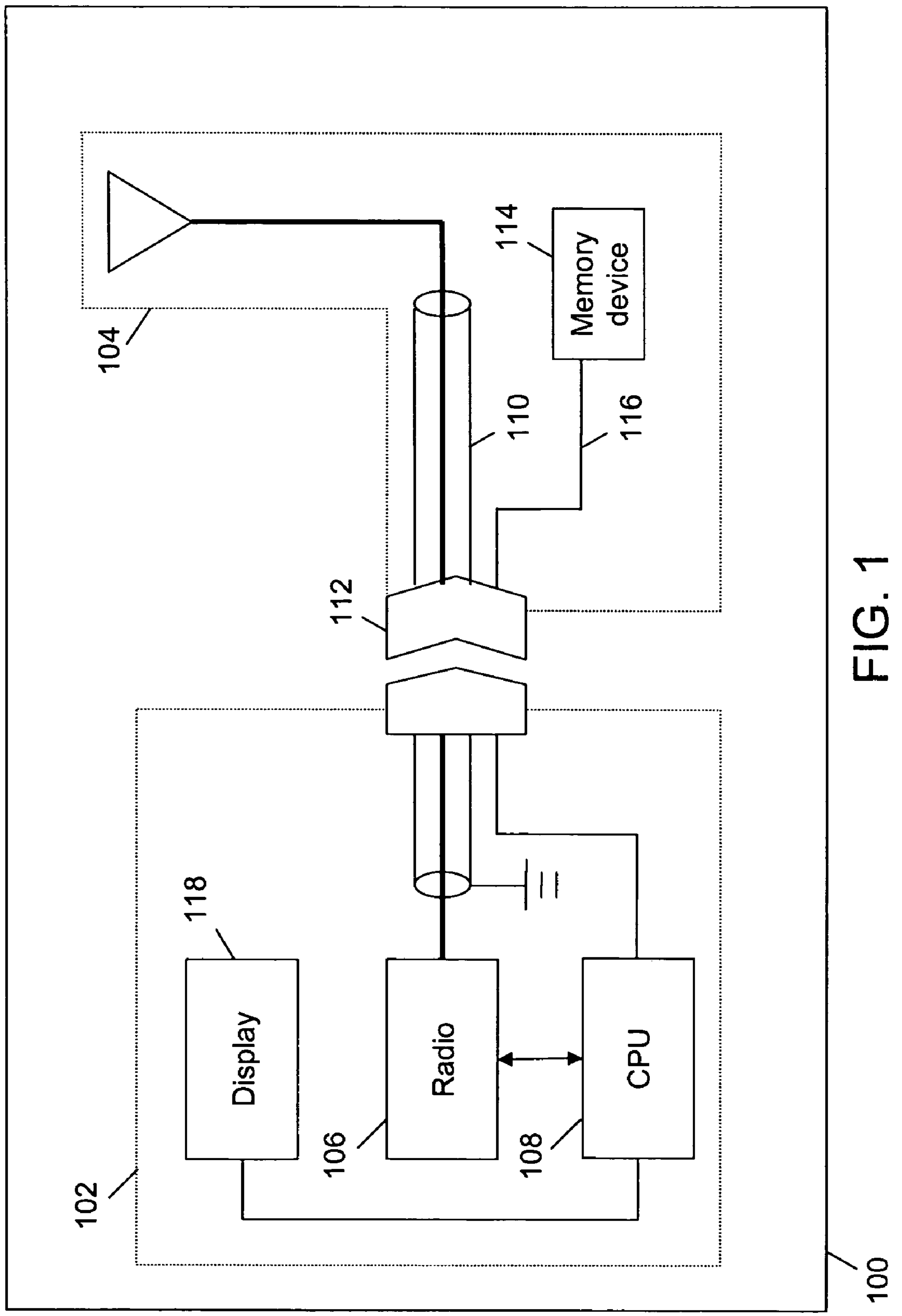
FIG. 1 depicts a wireless communication system, in accordance with an exemplary embodiment of the invention.

FIG. 1 depicts a wireless communication system 100, in accordance with an exemplary embodiment of the present invention. Examples of wireless communication system 100 include computers, laptops, personal digital assistants (PDAs), cellular phones, and the like. Wireless communication system 100 includes a wireless device 102 and an antenna 104. An example of wireless device 102 is a wireless access point (WAP), used by computers or laptops to connect to a wireless network. Although only one antenna is shown in FIG. 1, wireless communication system 100 can include more than one antenna. Wireless device 102 further includes a radio 106 and a central processing unit (CPU) 108. In an exemplary embodiment of the present invention, radio 106 is a software definable radio (SDR). This means that CPU 108 can configure radio 106. CPU 108 configures radio 106, based on the specifications of antenna 104.

In one embodiment of the present invention, antenna 104 is a non-captive antenna. Non-captive antennae are user-selectable antenna used in wireless communication system 100. A non-captive antenna can be removed from wireless communication system 100. Antenna 104 is connected to wireless device 102 with the help of cable 110. Cable 110 can be, for example, a coaxial cable. A socket 112 is provided to form the connection between antenna 104 and wireless device 102.

Antenna 104 includes a memory device 114 that stores the specifications of antenna 104, in accordance with an embodiment of the present invention. The specifications stored in memory device 114 include, but are not limited to, type of antenna, gain characteristics across frequencies, voltage standing wave ratio (VSWR) across frequencies, radiation patterns, maximum power capacity, and manufacturing information.

Examples of antenna types include yagi antennae, sector antennae, patch antennae, parabolic antennae, and the likeso forth. The gain characteristics of antenna 104 define the sensitivity of antenna 104 at different frequencies. For example, gain characteristics across frequency can be stored in memory device 114 in the form of a table that comprises frequency ranges and the corresponding gain for the frequency ranges. VSWR is a measure of the non-uniformity of the antenna signal in cable 110. VSWR is defined as the ratio of the maximum radio frequency voltage to the minimum radio frequency voltage in cable 110. A high value of VSWR indicates more losses in cable 110. Radiation patterns define the power radiated by antenna 104 in different directions. For example, a radiation pattern can be stored in the form of a table comprising angle ranges in different directions, and the corresponding average power radiated in the various angle ranges. Manufacturing information, such as the manufacturer of antenna 104, the date of manufacture, the serial number, and the like, can also be stored in memory device 114.

In another embodiment of the present invention, memory device 114 stores an identification code that is used to identify antenna 104. The specifications of various antennae are stored in wireless device 102 in a memory (not shown in FIG. 1). On identifying antenna 104, the specifications of antenna 104 are retrieved from the memory, and CPU 108 uses these specifications to configure radio 106. For this purpose, the memory in wireless device 102 can be, for example, a random access memory (RAM) or a non-volatile memory, such as a hard disk.

In accordance with various embodiments of the present invention, memory device 114 can be in the form of hard-wired option bits or a serial electrically erasable programmable read only memory (EEPROM) device. In hardwired option bits, an identification code for antenna 104 is encoded into a plurality of physical wire connections 116 (shown in FIG. 1 as a single wire). This identification code is used to identify antenna 104. This is similar to the identification codes encoded in barcodes. When a current is passed through physical wire connections 116, variable levels of current are received from antenna 104. For example, in case the encoding is binary (i.e., either the current sent through a wire in physical wire connections 116 is received from antenna 104 or is blocked) and four wires are used, wireless communication system 100 can identify 16 (4^2) different antennae codes. Physical wire connections 116 are connected to wireless device 102 through socket 112. Similarly, a serial EEPROM device can store identification codes for identifying antenna 104. A serial EEPROM device can also store the specifications of antenna 104.

If a serial EEPROM device is used, a physical wire connects the serial EEPROM device and CPU 108. This physical wire passes through socket 112. In one embodiment of the present invention, a triaxial cable is used to connect wireless device 102 and antenna 104. Two wires in the triaxial cable carry radio frequency (RF) information to and from antenna 104. The third wire is used by CPU 108 to receive information from the serial EEPROM device. The inner shield of the triaxial cable is used as the ground reference for the RF signal and the signal from the serial EEPROM device. The outer shield is used to supply power (in the form of a direct current or DC) to the serial EEPROM device. The signal for the serial EEPROM device is modulated on top of the DC power signal. In an alternate embodiment, the outer shield is used to supply power to the serial EEPROM device during quiescent or inactive periods. This power is stored in a battery on the serial EEPROM device and is used when information is required from the serial EEPROM device. An exemplary 1-wire EEPROM device can be 'iButton', manufactured by Dallas Semiconductor.

A connection is established between wireless device 102 and antenna 104 with the help of a coaxial cable. This provides backward compatibility. In one embodiment of the present invention, socket 112 is a non-traditional connector between wireless device 102 and antenna 104. However, socket 112 allows connection between wireless device 102 and antenna 104 through connecters such as Threaded Neill-Concelman (TNC) connectors, Reverse Polarity TNC (RPTNC) connectors, Type N connectors, SubMiniature version A (SMA) connectors, Bayonet Neill-Concelman (BNC) connectors, and the likeso forth.

In another embodiment of the present invention, wireless device 102 further includes a display 118. Display 118 displays a warning if wireless device 102 cannot be configured based on the specifications obtained from antenna 104. A warning can also be displayed if a non-compliant antenna is connected to wireless device 102. For example, if a user of wireless communication system 100 connects a high-gain antenna, which does not satisfy regulatory compliance, to wireless device 102, a warning to the user can be displayed on display 118. Display 118 can be a monitor or screen in wireless device 102. Display 118 can also be a light-emitting diode (LED) light that indicates that wireless device 102 cannot be configured. In an alternate embodiment of the present invention, an audible alarm is generated if wireless device 102 cannot be configured based on the specifications of antenna 104. Further, if radio 106 is an SDR, and antenna 104 is a non-compliant antenna, the use of antenna 104 with wireless device 102 can be disallowed.

Figure 2:
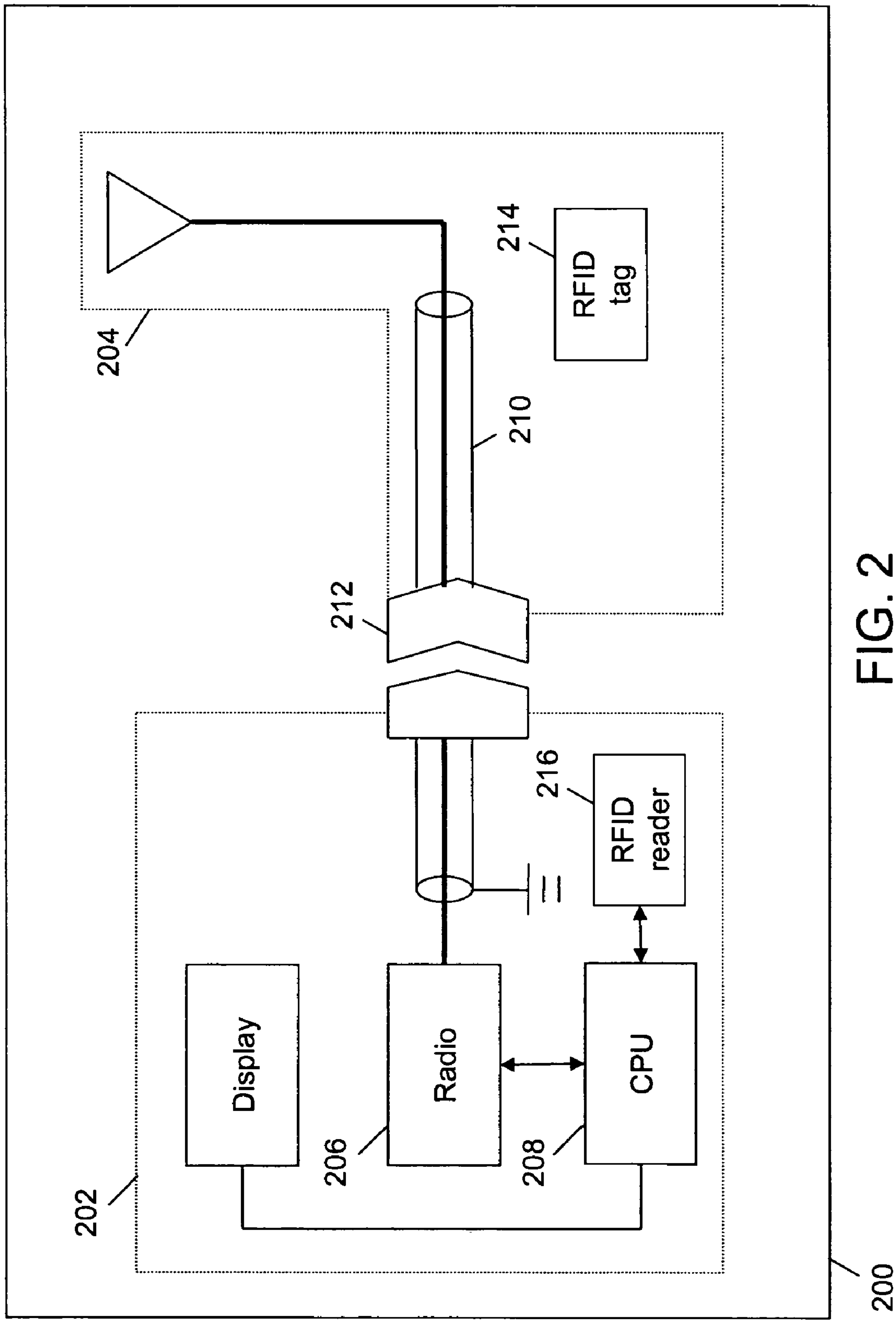
FIG. 2 depicts a wireless communication system, in accordance with another exemplary embodiment of the invention.

FIG. 2 depicts a wireless communication system 200, in accordance with another embodiment of the present invention. Wireless communication system 200 includes a wireless device 202 and an antenna 204. The components in wireless communication system 200, such as radio 206, CPU 208, cable 210, and connecter 212, are similar to the like named components in wireless communication system 100 (as shown in FIG. 1). However, the specifications of antenna 204 are stored in a radio frequency identification (RFID) tag 214. An RFID reader 216 in wireless device 202 reads these specifications. RFID tag 214 can also store codes that help in identifying antenna 204. In this embodiment, no separate physical wire is required to obtain the specifications of antenna 204.

Figure 3:
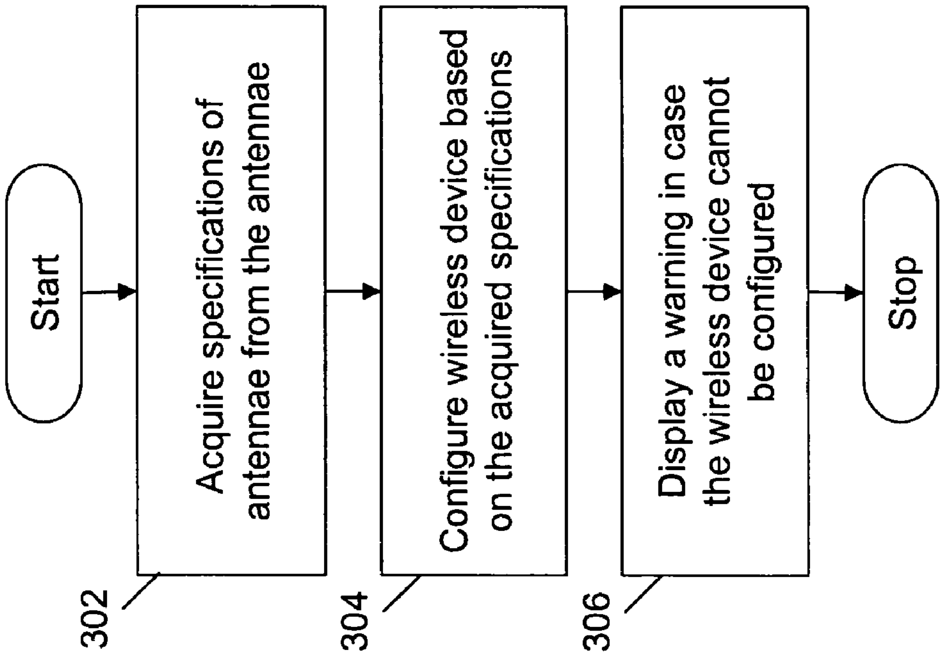
FIG. 3 is a flowchart illustrating a method for presence detection of antennae in a wireless communication system, in an exemplary embodiment of the invention.

FIG. 3 is a flowchart illustrating a method for presence detection of antennae in a wireless communication system. At step 302, specifications of one or more antennae associated with the wireless communication system are acquired. These specifications are acquired from memory devices in the antennae. At step 304, a wireless device in the wireless communication system is configured based on the acquired specifications. If the wireless device cannot be configured based on the acquired specifications, a warning message is displayed at step 306. An audible alarm can also be generated if the wireless device cannot be configured based on the acquired specifications.

Various embodiments of the present invention can be used for presence detection of antennae in wireless devices. Service technicians can check for the presence of antennae in wireless devices remotely, without having to physically inspect the wireless devices. Radios in wireless devices are configured based on basic specifications such as maximum power output, maximum gain and maximum VSWR. These specifications are used to configure the radios. For example, the specifications can be used to decide the digital signal processing algorithm, the type of demodulation, and the type of pre- and post-processing used in the radios. Therefore, the various embodiments allow wireless devices to maximize RF performance, based on the specifications of individual antennae, instead of using a blanket configuration based on the worst expected specifications of an antenna. Further, the various embodiments ensure that only regulatory compliant antennae are used with wireless devices. The use of non-compliant antennae can be restricted by using the present invention. However, traditional antennas that do not include memory devices can be used with the present invention, since it provides backward compatibility.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" (e.g., the CPU) for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. An antenna system for wireless communication, the antenna system comprising:

an antenna configured to provide wireless communication, wherein the antenna is configured to allow coupling to a plurality of wireless devices; and a housing including the antenna, the housing including one or more memory devices, each of the one or more memory devices storing information for specifications for wireless transmission specific to the antenna to allow customized configuration of a radio in each of the plurality of wireless devices to the antenna based on the specifications specific to the antenna, wherein the housing is separate from and detachable from a wireless device in the plurality of wireless devices, wherein the antenna is configured to be coupled to the wireless device and information for specifications are downloadable to the wireless device for use in configuring a radio of the wireless device for wireless transmission specific to the antenna.

2. The antenna according to claim 1 wherein the one or more memory devices include hardwired option bits, serial EEPROM devices, and/or RFID tags.

3. The antenna according to claim 1 wherein the specifications of the antenna include antenna type, gain characteristics of the antenna across frequencies, voltage standing wave ratio (VSWR) of the antenna across frequencies, radiation patterns, maximum power capacity, and/or manufacturing information.

4. The antenna according to claim 1 further comprising a connector between the one or more antennae and a wireless device.

5. The antenna according to claim 4 wherein the of the connector comprises a coaxial cable and/or a triaxial cable.

6. The antenna of claim 1, wherein the information for the specifications includes a reference useable by the wireless device to determine the specifications for the antenna.

7. The antenna of claim 1, wherein the specifications allow the wireless device to maximize wireless transmission performance based on the specifications specific to the antenna instead of using standard specifications designed for different antennas that can be attached to the wireless device.

8. A wireless communication system, the wireless communication system comprising:

an antenna configured to provide wireless communication, wherein the antenna is configured to allow coupling to a plurality of wireless devices;

a housing including the antenna, the housing comprising storage configured to store information for specifications for wireless transmission specific to the antenna to allow customized configuration of a radio in each of the plurality of wireless devices to the antenna based on the specifications specific to the antenna, a wireless device in the plurality of wireless devices configured to determine the specifications using the information for the specifications that are downloaded upon attachment of the antenna to the wireless device, the wireless device using the specifications to configure a radio of the wireless device for wireless transmission specific to the antenna, wherein the housing is separate from and detachable from the wireless device in the plurality of wireless devices.

9. The wireless communication system according to claim 8, further comprising a connector between the one or more antenna and the wireless device.

10. The wireless communication system according to claim 9, wherein the connector comprises a coaxial cable and/or a triaxial cable.

11. The wireless communication system according to claim 8, wherein the radio comprises a software definable radio, wherein the radio is configured using the specifications for the antenna.

12. The wireless communication system according to claim 8, further comprising a display configured to display a warning message if the wireless device cannot be configured according to the specifications of the antenna.

13. The wireless communication system according to claim 8, wherein the storage comprises hardwired option bits, serial EEPROM devices, and/or RFID tags.

14. The wireless communication system according to claim 8, wherein the antenna comprises a captive antenna and/or non-captive antenna.

15. The wireless communication system of claim 8, wherein the wireless device downloads the information for specifications through a connection to the antenna.

16. The wireless communication system of claim 8, wherein the specifications allow the wireless device to maximize wireless transmission performance based on the specifications specific to the antenna instead of using standard specifications designed for different antennas that can be attached to the wireless device.

* * * * *